United States Patent

Miyake

[11] Patent Number: 5,911,007
[45] Date of Patent: Jun. 8, 1999

[54] IMAGE PROCESSING METHOD AND APPARATUS

[75] Inventor: Nobutaka Miyake, Yokohama, Japan

[73] Assignee: Canon Kabushiki Kaisha, Tokyo, Japan

[21] Appl. No.: 08/916,922

[22] Filed: Aug. 22, 1997

Related U.S. Application Data

[63] Continuation of application No. 08/329,408, Oct. 27, 1994, abandoned.

[30] Foreign Application Priority Data

Oct. 29, 1993 [JP] Japan ................................ 5-272708

[51] Int. Cl.$^6$ .............................. G06K 9/36; G06K 9/46
[52] U.S. Cl. ...................... 382/233; 382/235; 382/250; 382/268
[58] Field of Search .................. 382/235, 233, 382/248, 250, 299, 269, 275, 268; 358/432, 433, 261.3; 348/395, 403, 420

[56] References Cited

U.S. PATENT DOCUMENTS

| 4,754,492 | 6/1988 | Malvar | 382/268 |
|---|---|---|---|
| 5,101,446 | 3/1992 | Resnikoff et al. | 382/248 |
| 5,227,875 | 7/1993 | Suu et al. | 348/384 |
| 5,359,676 | 10/1994 | Fan | 358/433 |
| 5,422,963 | 6/1995 | Chen et al. | 358/433 |

FOREIGN PATENT DOCUMENTS

| 3-204268 | 9/1991 | Japan . | |
|---|---|---|---|
| 4185171 | 7/1992 | Japan | 358/261.3 |
| 4-229382 | 8/1992 | Japan . | |
| 4-333989 | 11/1992 | Japan . | |

OTHER PUBLICATIONS

Chang et al., "Transform Coding of Arbitrarily–Shaped Image Segments", Aug. 1, 1993, pp. 83–90.

Haddad et al., "Digital Signal Processing Theory, Applications, and Hardware", 1991, pp. 408–411.

Haddad et al., Digital Signal Processing—Theory, Applications, and Hardware, 1991, pp. 408–410, Textbook.

*Primary Examiner*—Amelia Au
*Assistant Examiner*—Timothy M. Johnson
*Attorney, Agent, or Firm*—Fitzpatrick, Cella, Harper & Scinto

[57] ABSTRACT

An image processing apparatus for orthogonally transforming image information in a block comprising NXN pixels, and creating block information composed of MXM pixels (N≠M) on the basis of the information orthogonally transformed. The created block information is reverse transformed into real spatial information having MXM pixels. The reverse transformation is performed using a basic vector other than a transposed matrix of an orthogonal transformation matrix of MXM pixels.

10 Claims, 19 Drawing Sheets

INTERPOLATED POINT E = ( 1−i ) ( 1−j ) A + i· (1−j )B + j· ( 1−i ) C + ijD

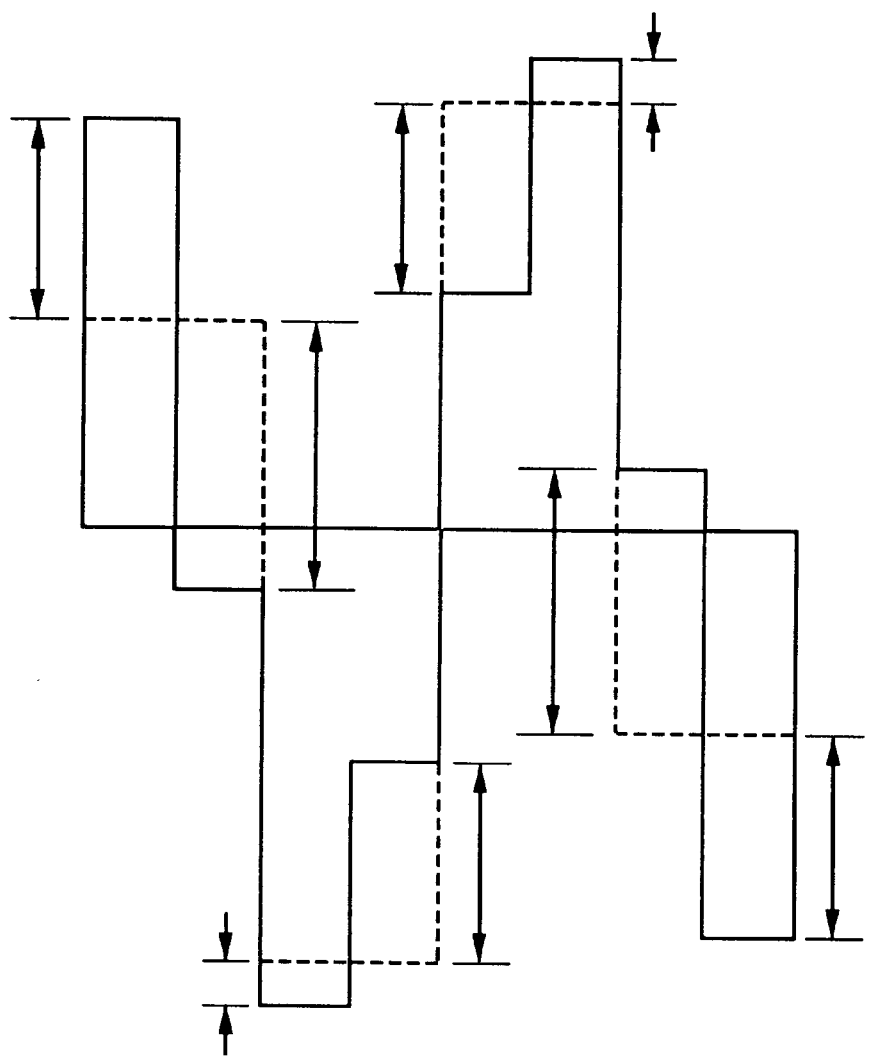
FIG. 5

FIG. 6A (PRIOR ART)

| | | | |
|---|---|---|---|
| 50 | 200 | 50 | 50 |
| 50 | 200 | 50 | 50 |
| 50 | 200 | 50 | 50 |
| 50 | 200 | 50 | 50 |

FIG. 6B (PRIOR ART)

| | | | |
|---|---|---|---|
| 350.00 | 81.18 | -150.00 | -195.98 |
| 0 | 0 | 0 | 0 |
| 0 | 0 | 0 | 0 |
| 0 | 0 | 0 | 0 |

FIG. 6C (PRIOR ART)

| | | | | | | | |
|---|---|---|---|---|---|---|---|
| 350.00 | 81.18 | -150.00 | -195.98 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 6D (PRIOR ART)

| | | | | | | | |
|---|---|---|---|---|---|---|---|
| 9 | 105 | 192 | 181 | 92 | 24 | 30 | 68 |
| 9 | 105 | 192 | 181 | 92 | 24 | 30 | 68 |
| 9 | 105 | 192 | 181 | 92 | 24 | 30 | 68 |
| 9 | 105 | 192 | 181 | 92 | 24 | 30 | 68 |
| 9 | 105 | 192 | 181 | 92 | 24 | 30 | 68 |
| 9 | 105 | 192 | 181 | 92 | 24 | 30 | 68 |
| 9 | 105 | 192 | 181 | 92 | 24 | 30 | 68 |
| 9 | 105 | 192 | 181 | 92 | 24 | 30 | 68 |

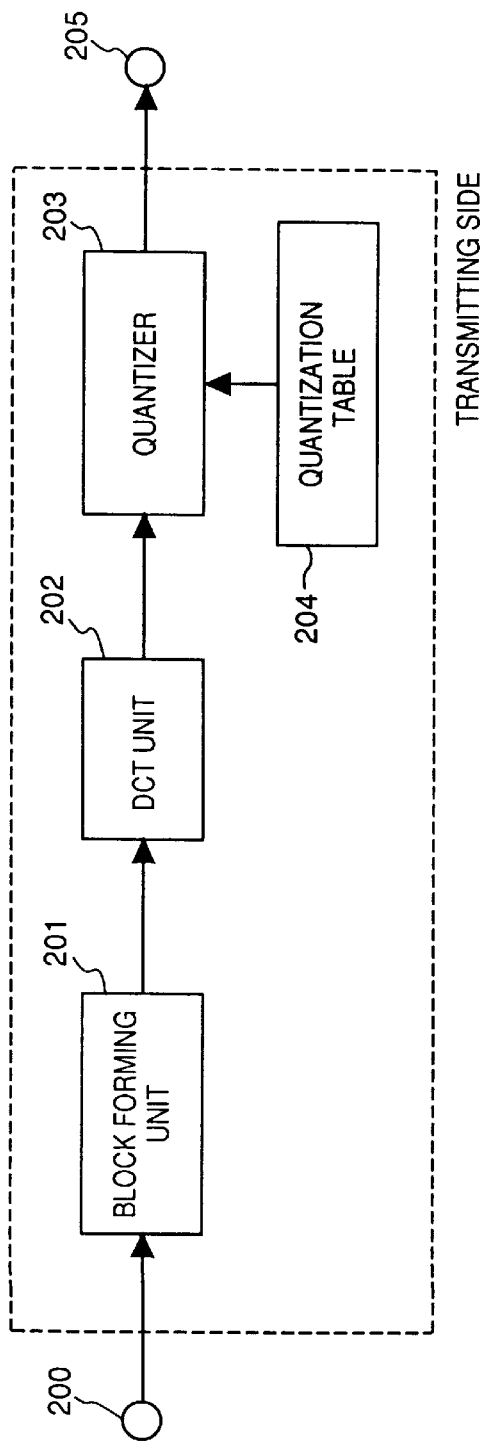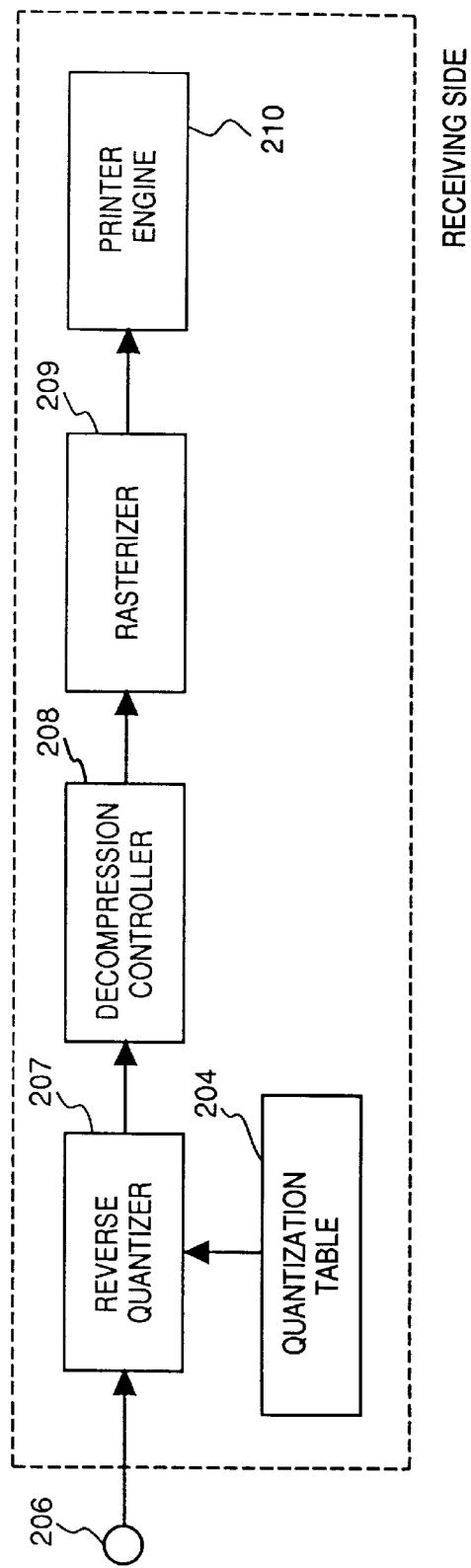

FIG. 9

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 10

$$\begin{bmatrix} 1.0000 & 0.9239 & 0.7071 & 0.3827 & 0 & 0 & 0 & 0 \\ 1.0000 & 0.9239 & 0.7071 & 0.3827 & 0 & 0 & 0 & 0 \\ 1.0000 & 0.3827 & -0.7071 & -0.9239 & 0 & 0 & 0 & 0 \\ 1.0000 & 0.3827 & -0.7071 & -0.9239 & 0 & 0 & 0 & 0 \\ 1.0000 & -0.3827 & -0.7071 & 0.9239 & 0 & 0 & 0 & 0 \\ 1.0000 & -0.3827 & -0.7071 & 0.9239 & 0 & 0 & 0 & 0 \\ 1.0000 & -0.9239 & 0.7071 & -0.3827 & 0 & 0 & 0 & 0 \\ 1.0000 & -0.9239 & 0.7071 & -0.3827 & 0 & 0 & 0 & 0 \end{bmatrix}$$

FIG. 12A

| | | | |
|---|---|---|---|
| 50 | 200 | 50 | 50 |
| 50 | 200 | 50 | 50 |
| 50 | 200 | 50 | 50 |
| 50 | 200 | 50 | 50 |

FIG. 12B

| | | | |
|---|---|---|---|
| 350.00 | 81.18 | -150.00 | -195.98 |
| 0 | 0 | 0 | 0 |
| 0 | 0 | 0 | 0 |
| 0 | 0 | 0 | 0 |

FIG. 12C

| | | | | | | | |
|---|---|---|---|---|---|---|---|
| 350.00 | 81.18 | -150.00 | -195.98 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 12D

| | | | | | | | |
|---|---|---|---|---|---|---|---|
| 50 | 50 | 200 | 200 | 50 | 50 | 50 | 50 |
| 50 | 50 | 200 | 200 | 50 | 50 | 50 | 50 |
| 50 | 50 | 200 | 200 | 50 | 50 | 50 | 50 |
| 50 | 50 | 200 | 200 | 50 | 50 | 50 | 50 |
| 50 | 50 | 200 | 200 | 50 | 50 | 50 | 50 |
| 50 | 50 | 200 | 200 | 50 | 50 | 50 | 50 |
| 50 | 50 | 200 | 200 | 50 | 50 | 50 | 50 |
| 50 | 50 | 200 | 200 | 50 | 50 | 50 | 50 |

FIG. 13

$$\begin{bmatrix} 1.0000 & 0.9808 & 0.9239 & 0.8315 & 0.7071 & 0.5556 & 0.3827 & 0.1951 \\ 1.0000 & 0.8315 & 0.3827 & -0.1951 & -0.7071 & -0.9808 & -0.9239 & -0.5556 \\ 1.0000 & 0.5556 & -0.3827 & -0.9808 & -0.7071 & 0.1951 & 0.9239 & 0.8315 \\ 1.0000 & 0.1951 & -0.9239 & -0.5556 & 0.7071 & 0.8315 & -0.3827 & -0.9808 \\ 1.0000 & -0.1951 & -0.9239 & 0.5556 & 0.7071 & -0.8315 & -0.3827 & 0.9808 \\ 1.0000 & -0.5556 & -0.3827 & 0.9808 & -0.7071 & -0.1951 & 0.9239 & -0.8315 \\ 1.0000 & -0.8315 & 0.3827 & 0.1951 & -0.7071 & 0.9808 & -0.9239 & 0.5556 \\ 1.0000 & -0.9808 & 0.9239 & -0.8315 & 0.7071 & -0.5556 & 0.3827 & -0.1951 \end{bmatrix}$$

FIG. 18

$$\begin{bmatrix} 1.0000 & 0.9808 & 0.9239 & 0.8315 & 0 & 0 & 0 & 0 \\ 1.0000 & 0.9315 & 0.3827 & -0.1951 & 0 & 0 & 0 & 0 \\ 1.0000 & 0.7556 & -0.3827 & -0.9808 & 0 & 0 & 0 & 0 \\ 1.0000 & 0.1951 & -0.9239 & -0.5556 & 0 & 0 & 0 & 0 \\ 1.0000 & -0.1951 & -0.9239 & 0.5556 & 0 & 0 & 0 & 0 \\ 1.0000 & -0.7556 & -0.3827 & 0.9808 & 0 & 0 & 0 & 0 \\ 1.0000 & -0.9315 & 0.3827 & 0.1951 & 0 & 0 & 0 & 0 \\ 1.0000 & -0.9808 & 0.9239 & -0.8315 & 0 & 0 & 0 & 0 \end{bmatrix}$$

FIG. 19
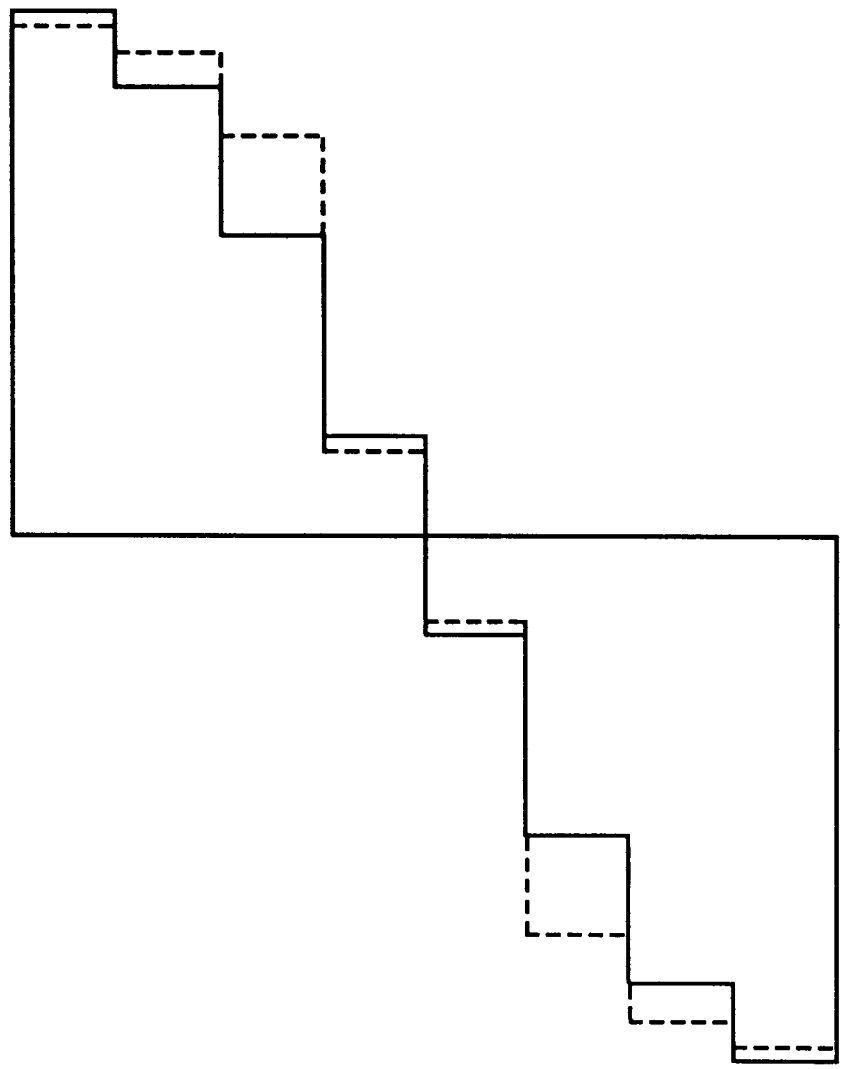

FIG. 20A

| | | | |
|---|---|---|---|
| 100 | 100 | 100 | 100 |
| 100 | 125 | 150 | 125 |
| 100 | 150 | 200 | 150 |
| 100 | 125 | 150 | 125 |

FIG. 20B

| | | | |
|---|---|---|---|
| 500.00 | -46.19 | -50.00 | -19.13 |
| -46.19 | 21.34 | 23.10 | -8.84 |
| -50.00 | 23.10 | 25.00 | -9.57 |
| 19.13 | -8.84 | -9.57 | 3.66 |

FIG. 20C

| | | | | | | | |
|---|---|---|---|---|---|---|---|
| 500.00 | -46.19 | -50.00 | 19.13 | 0 | 0 | 0 | 0 |
| -46.19 | 21.34 | 23.10 | -8.84 | 0 | 0 | 0 | 0 |
| -50.00 | 23.10 | 25.00 | -9.57 | 0 | 0 | 0 | 0 |
| 19.13 | -8.84 | -9.57 | 3.66 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 20D

| | | | | | | | |
|---|---|---|---|---|---|---|---|
| 100 | 100 | 99 | 98 | 97 | 97 | 98 | 99 |
| 100 | 100 | 102 | 105 | 106 | 106 | 104 | 103 |
| 99 | 102 | 110 | 122 | 131 | 130 | 121 | 112 |
| 98 | 105 | 122 | 147 | 166 | 165 | 146 | 126 |
| 97 | 106 | 131 | 166 | 193 | 192 | 164 | 137 |
| 97 | 106 | 130 | 165 | 192 | 190 | 163 | 136 |
| 98 | 104 | 121 | 146 | 164 | 163 | 144 | 125 |
| 99 | 103 | 112 | 126 | 137 | 136 | 125 | 115 |

FIG. 20E

| | | | | | | | |
|---|---|---|---|---|---|---|---|
| 100 | 100 | 99 | 98 | 97 | 96 | 98 | 99 |
| 100 | 100 | 101 | 102 | 103 | 103 | 102 | 101 |
| 99 | 101 | 107 | 118 | 125 | 126 | 118 | 110 |
| 98 | 102 | 118 | 147 | 166 | 170 | 148 | 126 |
| 97 | 103 | 125 | 166 | 193 | 198 | 167 | 137 |
| 96 | 103 | 126 | 170 | 198 | 203 | 171 | 139 |
| 98 | 102 | 118 | 148 | 167 | 171 | 148 | 127 |
| 99 | 101 | 110 | 126 | 137 | 139 | 127 | 115 |

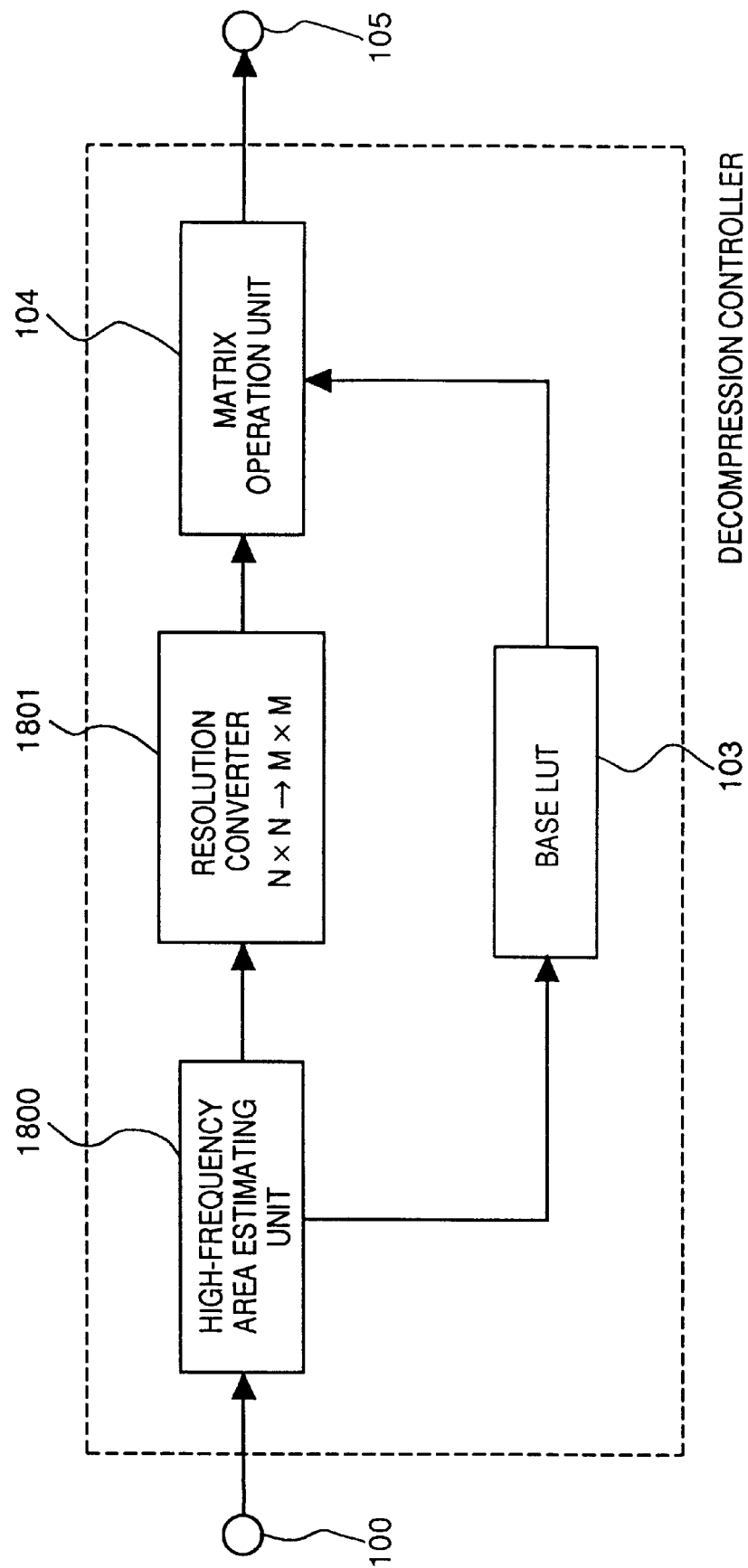

IMAGE PROCESSING METHOD AND APPARATUS

This application is a continuation of application Ser. No. 08/329,408 filed Oct. 27, 1994, now abandoned.

BACKGROUND OF THE INVENTION

This invention relates to an image processing method and apparatus for effecting a conversion from low-resolution information to high-resolution information in an image output apparatus such as a printer for outputting input image information upon enlarging the image information by a zoom function, or in communication between devices whose resolutions differ.

Various methods of converting input low-resolution information to high-resolution information have been proposed. In these proposed prior-art methods, the conversion processing differs depending upon type of image to be processed. Examples of such images are a multivalued image having gray-scale information for each pixel, a binary image binarized by pseudo-halftone processing such as in the dither method or error-diffusion method, a binary image or character image binarized based upon a fixed threshold value, etc. In the present invention, the image dealt with is a multivalued image such as a natural picture having gray-scale information for each pixel. However, the conventional interpolation method used is generally nearest neighbor interpolation, in which pixel values nearest to an interpolated point are arrayed, as shown in FIG. 1, or bi-linear interpolation in which, as shown in FIG. 2, a pixel value E is decided by the following operation based upon the distances of four points (the pixel values of which are assumed to be A, B, C, D) surrounding the interpolated point:

$$E=(1-i)(1-j)A+i\cdot(1-j)B+(1-i)C+ijD$$

where, if the pixel-to-pixel distance is 1, the pixel value E is at a distance i from the A along the horizontal axis and a distance j from A along the vertical axis ($i \leq 1$, $j \leq 1$).

In image transmission such as in a color facsimile apparatus (FAX), it is essential that the image information be compressed before being transmitted over a transmission line. The JPEG (Joint Photographic Experts Group) method has been established in recent years as an international standard for encoding still color images. According to the JPEG method, image information is compressed by quantization of transformation coefficients by DCT (discrete cosine transform) and entropic encoding of transformation coefficients after quantization.

For the purpose of application to communication between devices having different resolutions, much research is now being carried out into techniques through which direct decompression from compressed information and conversion of resolution may be executed at the same time. Several methods in which the aforesaid DCT and conversion of resolution are combined have been proposed in Japanese Patent Application Laid-Open Nos. 4-229382, 4-333989; etc.). According to these proposed methods, first DCT is applied. When the resulting image is enlarged, "0" is inserted for new high-frequency components. When the resulting image is reduced, on the other hand, block size is changed by dropping the currently existing high-frequency components. This is followed by applying IDCT.

The transformation coefficients of two-dimensional DCT of (NXN) pixels are obtained by $$F(u, v) = (2/N)C(u)C(v)\sum_{m=0}^{N-1}\sum_{n=0}^{N-1} f(m, n)\cos((2m + 1)u\pi/2N)\cos[(2n + 1)v\pi/2N) \qquad (1)$$

The IDCT is obtained by $$f(m, n) = (2/N)\sum_{u=0}^{N-1}\sum_{v=0}^{N-1} C(u)C(v)F(u, v)\cos((2m + 1)u\pi/2N)\cos((2n + 1)v\pi/2N) \qquad (2)$$

together with $$C(p) = 1/\sqrt{2} \qquad (p = 0)$$
$$C(p) = 1 \qquad (p \neq 0)$$

If we let [F(u,v)] represent the matrix of NXN− number of F(u,v) and let [[F(u,v)]] represent a decompressed matrix in which "0" has been substituted for high-frequency components, then we have $$[[F(u, v)]] = \begin{bmatrix} [F(u, v)] & [0] \\ [0] & [0] \end{bmatrix} \qquad (3)$$

(the DC component is at the upper left).

This method makes it possible to perform a resolution conversion of high picture quality at the same time as decompression.

However, the example of the prior art described above has certain drawbacks.

The method of FIG. 1 is advantageous in that the arrangement is a simple one. In addition, this method is suitable when the image dealt with is a geometrical image having many vertical and horizontal lines. However, in a case where the method is applied to a natural picture or the like, pixel values are decided for every block enlarged. As a consequence, blocks become visually conspicuous and picture quality declines.

The method of FIG. 2 is generally used when enlarging a natural picture. Though picture quality is such that the picture is averaged and smoothened, blurring occurs at edge portions and at portions requiring sharpness. Furthermore, in case of an image obtained by scanning a map or a natural picture containing characters, vital information is not transmitted to the receiving party owing to blurring caused by interpolation.

Further, the method of conversion of resolution (here only enlargement is considered) combined with compression by orthogonal transformation described above is an epochmaking technique in which it is possible to readily restore spatial information, which has undergone a conversion in resolution, from compressed information. However, this approach is not necessarily appropriate for all types of images.

The cause of a deterioration in picture quality when using this technique will now be described in detail.

To simplify the description, an example will be described in which "0" is substituted for high-frequency components of image information which has undergone DCT at a block size of 4×4, the information is converted to a block size of 8×8 and IDCT is applied.

Two-dimensional DCT corresponds to carrying out separation of components at a base image corresponding to the basic vector of a one-dimensional DCT, and a one-dimensional DCT is applied to the image independently in the horizontal and vertical direction. Accordingly, the description will be limited to the one-dimensional transform.

In FIG. 3, (a) illustrates basic vectors of a fourth-order DCT, and (b) illustrates basic vectors of sequence numbers 0 to 3 of an eighth-order DCT.

Both sequence numbers 0 indicate DC components and the other sequence numbers indicate AC components.

In a case where a fourth-order DCT is applied, the transformation coefficients outputted after application of the DCT represent power with respect to each basic vector shown in (a) of FIG. 3. In a conversion of resolution by making a substitution from fourth order to eighth order, the values of the transformation coefficients obtained by the fourth-order DCT are handled as though they were calculated as is by an eighth-order base. (DC components require correction by a proportional computation owing to a disparity in block size.)

FIG. 4 illustrates the disparity between the fourth-order and eighth-order DCT bases of sequence number 1 shown in FIG. 3. The dashes lines illustrate the fourth-order base and the solid lines the eighth-order base. (Since the number of pixels used in the bases differ between the fourth- and eighth-order DCTs, the fourth-order base is illustrated together with the eighth-order base.) The portions indicated by the arrows in FIG. 4 show the disparity between the fourth-order base and the eighth-order base.

FIG. 5 illustrates the disparity between the fourth-order and eighth-order DCT bases of sequence number 3 shown in FIG. 3. As in FIG. 4, the dashes lines illustrate the fourth-order base and the solid lines the eighth-order base. The disparity between them is indicated by the arrows. A comparison of FIGS. 4 and 5 shows that the larger the sequence number, the greater the disparity. In order to replace the base of the fourth-order DCT by the base of the eighth-order DCT, fine portions between adjacent pixels are expressed as a matter of course and portions of improved picture quality appear. Conversely, however, owing to the disparity between the bases of the fourth-order DCT and eighth-order DCT in each sequence, fine information is created arbitrarily where information is not present.

FIGS. 6A to 6D show an example in which an edge in an image has been subjected to processing according to the above-described example of the prior art. FIG. 6A illustrates one block of input image information in real space. In a case where this technique is actually applied to a device connected to a host computer of a printer or the like, steep edges often are generated in characters, line images and computer graphics CG).

FIG. 6B illustrates the results of subjecting the information shown in FIG. 6A to DCT at a block size of 4×4; FIG. 6C illustrates the results of substituting "0" into the high-frequency components on the basis of the transformation coefficients of FIG. 6A; and FIG. 6D illustrates the results of applying an 8×8 IDCT on the basis of the transformation coefficients of FIG. 6C. Ordinarily, with a compression method based upon DCT, an operation is applied in which transformation coefficients are quantized or amount of code is reduced by cutting high-frequency components. However, a detailed description of this is not given in this invention.

As will be appreciated from the results of IDCT shown in FIGS. 6A to 6D, ringing-type noise is produced also at portions other than edges owing to replacement of the fourth-order base by the eighth-order base. The reason for this is that from sequence numbers 0 to 3 of the eighth-order base, power can be substituted and filled by replacement of the base but power is "0" with respect to basic vectors in the region of higher frequency, namely from sequence numbers 4 to 7. The above-mentioned ringing noise is the result of this imbalance. In other words, irrespective of the fact that a portion corresponding to the above-described disparity between bases is added on by adopting the eighth-order base, this is not dealt with at all in the high-frequency region. Consequently, so-called "mosquito noise" is produced just as when high frequencies are cut at the time of quantization.

SUMMARY OF THE INVENTION

Accordingly, an object of the invention is to provide an image processing method and apparatus through which it is possible to prevent a deterioration in image quality that accompanies an increase in block size as well as a deterioration in image quality that occurs when quantization is performed.

According to an embodiment of the present invention, the foregoing object is attained by providing an image processing apparatus for orthogonally transforming image information in a block comprising N×N pixels, creating block information composed of M×M pixels (N≠M) on the basis of the information orthogonally transformed, and reverse-transforming this block information to real spatial information composed of M×M pixels, the apparatus having reverse transformation means for performing the reverse transformation using basic vectors other than a transposed matrix $[G_M]^t$ of an orthogonal transformation matrix $[G_M]$ of M×M pixels.

According to another embodiment of the present invention, the foregoing object is attained by providing an image processing method for orthogonally transforming image information in a block comprising N×N pixels, creating block information composed of M×M pixels (N≠M) on the basis of the information orthogonally transformed, and reverse-transforming this block information to real spatial information composed of M×M pixels, the method having a reverse transformation step of performing the reverse transformation using a basic vector other than a transposed matrix $[G_M]^t$ of an orthogonal transformation matrix $[G_M]$ of M×M pixels.

In accordance with this arrangement, image information in a block comprising N×N pixels is subjected to an orthogonal transformation, block information composed of M×M pixels (N≠M) is created on the basis of the information orthogonally transformed, and this block information is reversely transformed to real spatial information composed of M×M pixels. At such time the reverse transformation is performed using a basic vector other than a transposed matrix $[G_M]^t$ of an orthogonal transformation matrix $[G_M]$ of M×M pixels. As a result, it is possible to prevent a deterioration in image quality that accompanies an increase in block size as well as a deterioration in image quality that occurs when quantization is performed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram comparing bases of fourth-order DCT and eighth-order DCT at sequence number 3;

FIGS. 6A to 6D are diagrams illustrating an example of DCT of image information, an increase in size and IDCT according to the prior art;

FIGS. 8A and 8B are block diagrams illustrating the construction of transmitting and receiving sides according to the first embodiment;

FIG. 9 is a diagram showing an example of a quantization table;

FIG. 10 is a diagram showing an example of basic vectors;

FIGS. 12A to 12D are diagrams illustrating an example of a DCT of image information, an increase in size and an IDCT;

FIG. 13 is a diagram illustrating basic vectors of an IDCT;

FIG. 18 is a diagram showing an example of basic vectors according to the third embodiment;

FIG. 19 is a diagram showing comparison of basic vectors according to the third embodiment;

FIGS. 20A to 20E are diagrams illustrating an example of DCT of image information, an increase in size and reverse transformation based upon a disparity in basic vectors;

FIG. 24 is a block diagram illustrating the construction of a decompression control unit according to a fifth embodiment of the present invention.

DESCRIPTION OF THE PREFERRED EMBODIMENTS

Preferred embodiments of the present invention will now be described in detail with reference to the drawings.

The image processing apparatus according to the embodiments of the invention is effective mainly when incorporated in an image output apparatus such as a printer, or in the devices of a network in which there are different resolutions, such as in facsimile machines. However, the image processing apparatus is capable of being installed as application software in an apparatus other than an image output apparatus or in a host computer.

<First Embodiment>

Figure 7:
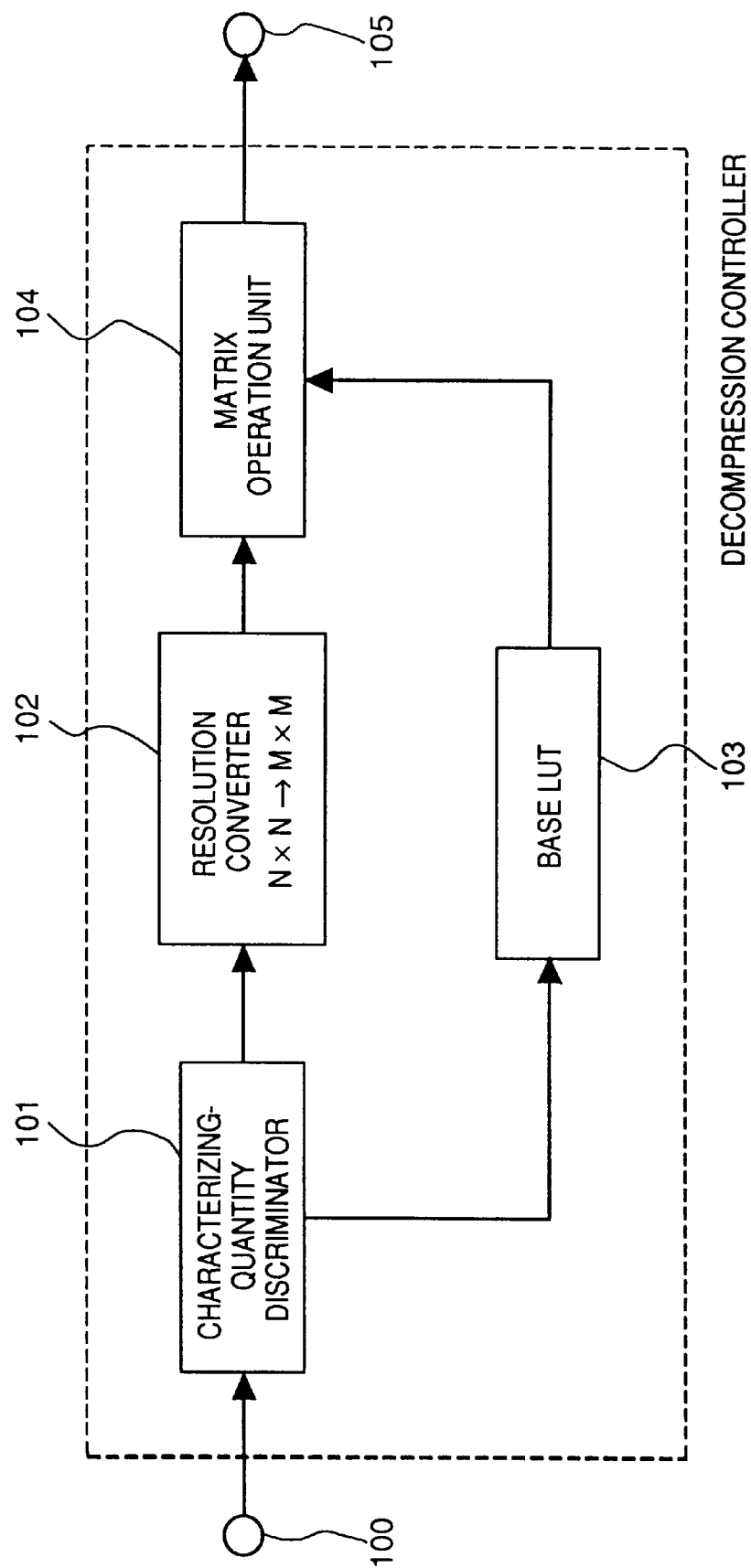
FIG. 7 is a block diagram illustrating the construction of a decompression control unit according to a first embodiment of the present invention.

FIGS. 7, 8A and 8B are block diagrams showing the principal portions of a first embodiment. The operation procedure of the first embodiment will now be described with reference to the block diagrams of FIGS. 7, 8A and 8B.

FIGS. 8A and 8B are block diagrams illustrating the construction of a transmitting side which executes encoding and a receiving side which executes decoding. Here a host computer may be assumed to be the transmitting side and a printer the receiving side. In a network, communication between devices having different resolutions may be assumed, as mentioned above. Furthermore, in the inner structure of an image output apparatus such as a printer of which input resolution and output resolution is different, it may be supposed that a side which stores image information of the input resolution is a transmitting side, a memory is a transmission line, and a side which reads the information stored in the memory and converts into the output resolution is a receiving side. In any case, in this embodiment the resolutions on the transmitting and receiving sides are represented by x and y, respectively, and the description is premised on the fact that if the relation x<y holds or the resolutions are equal, then an enlargement in image size is desired.

As shown in FIGS. 8A and 8B, the transmitting side has an input terminal 200 for entering image information representing an image of interest. The transmitting side may be an image input apparatus such as an image scanner, and the image information can then be created by application software in a host computer. The image information can be of other types as well. The transmitting side has a block forming unit 201 for partitioning the input image information into blocks of NXN pixels each. The block forming unit 201 is connected to a DCT unit 202 for applying a DCT every block. By virtue of this transformation, image information in real space is transformed to DCT space uncorrelated to each component. In the case of a natural picture, power concentrates especially in the low-frequency region. This DCT executes an operation indicated by Equation (1) in the example of the prior art. In actuality, however, the DCT often is realized by a matrix operation on a transformation matrix of basic vectors in which cosine terms are calculated.

The DCT unit 202 is connected to a quantizer 203 which quantizes DCT coefficients on the basis of quantization step information supplied by a quantization table 204. FIG. 9 is a diagram showing an example of the quantization table 204. The values indicated in FIG. 9 correspond to quantization steps. A linear scalar quantization is executed on the basis of these values. The quantized information is outputted on a transmission line from an output terminal 205. The output information may be information obtained by entropic encoding of the quantized transformation coefficients, as in the JPEG method. Though various types of encoding may be performed, it goes without saying that the method of transmission must be stipulated on both the transmitting and receiving sides.

On the receiving side, quantized transformation coefficients on the transmission line enter from an input terminal 206. The receiving side includes a reverse quantizer 207 which performs a reverse quantization on the basis of quantization steps information stored in a quantization table 204. The values of the quantization table 204 are usually decided on the transmitting side and on the receiving side. If this is not the case, then it will suffice to place the quantization table information on the transmission line and transmit (download) it. The output of the reverse quantizer 207 is applied to a decompression controller 208 which simultaneously executes decompression and resolution conversion, described later.

The details of the decompression controller 208 in the first embodiment will now be described with reference to the block diagram shown in FIG. 7.

The portion enclosed by the dashed line in FIG. 7 corresponds to the decompression controller 208. The latter includes an input terminal 100 to which the reverse-quantized block information is applied, as mentioned above. This information enters a characterizing-quantity discriminator 101 which, on the basis of the input block information, classifies the information by evaluating means. There are various classifying means, one example of which will be described later.

The discriminator 101 is connected to a resolution converter 102 which varies block size (only enlargement of block size is considered in the first embodiment). For example, if input block size is NXN pixels, then block size is made MXM pixels (N<M). As set forth earlier in connection with Equation (3) of the prior art, the method of enlarging block size involves placing input information (information after reverse quantization), in a block of NXN pixels from the input terminal 100, in a low-frequency region and substituting "0" into each component corresponding to a high-frequency region resulting from an increase in size performed anew.

A base LUT (look-up table) 103 is a ROM (read-only memory) in which basic vectors of several types have been stored. Originally the receiving side is for applying a reverse transformation to the DCT coefficients. Naturally, therefore, the reverse transformation is carried out using basic vectors (which correspond to a transposed matrix of DCT bases) of the IDCT. Otherwise, a correct restoration cannot be achieved. According to this embodiment, however, several transformation matrices created beforehand are stored and the optimum reverse-transformation basic vector is selected from among these in conformity with the characteristics of the particular image without adhering to the basic vectors of the IDCT. This is the major characterizing feature of this embodiment.

More specifically, as described above in connection with the prior art, the basic vectors of a DCT of an NXN block are not the same as the basic vectors, of the identical sequence numbers, of an IDCT of an MXM block. Owing to the occurrence of such an error, image quality deteriorates due to ringing noise, as illustrated in FIGS. 6A to 6D. This deterioration occurs because the original bases of the DCT of the NXN block are replaced by different bases. If this be so, then it is unnecessary to adhere solely to the IDCT operation in the reverse conversion. Accordingly, this embodiment makes a departure from the idea of "applying an IDCT to the result of a DCT" and does not limit the restoration to real space to IDCT. For this reason, the term reverse transformation is used.

Numeral 104 in FIG. 7 denotes a matrix operation unit for performing a matrix operation by the matrix based upon the basic vectors loaded in the base LUT 103. Ordinarily, the transformation matrix of the DCT of a square matrix is represented by "[D]" and the transposed matrix of [D] is represented by [D]$^t$. A two-dimensional DCT [F] of an input matrix [f] can be expressed as follows:

$$[F]=[D][f][D]^t \qquad (4)$$

The IDCT can be expressed as follows:

$$[f]=[D]^t[F][D] \qquad (5)$$

Since the basic vectors of the reverse transformation are not limited to the transposed matrix of [D], an output matrix [f'] after reverse transformation is found from $$[f']=[G][F'][G]^t \qquad (6)$$

where [G] represents the transformation matrix based upon the loaded basic vectors from the base LUT 103 and [F'] represents the transformation matrix after quantization, size change and reverse quantization.

In this case there is no limitation upon the orthogonality of the transformation matrix [G]. More specifically, it goes without saying that transformation based upon an orthogonal matrix is effective in order to eliminate the correlation between components in the compression of information. However, in a case where block size which has undergone an orthogonal transformation is subjected to reverse transformation upon being changed, the matrix of the reverse transformation is not limited to an orthogonal matrix. It will suffice to experimentally create basic vectors which will result in better picture quality after reverse transformation.

FIG. 10 is a diagram illustrating an example of basic vectors which apply a reverse transformation. This is for a case in which N=4, M=8 holds, i.e., in which the block size of the DCT on the transmitting side corresponds to 4×4 and the block size of the DCT on the receiving side corresponds to 8×8. The basic vectors shown in FIG. 10 have been created upon being made to conform to the basic vectors of a DCT in a block of 4×4 pixels. In order to simplify the description, the values in the table of FIG. 10 are values, to the fourth decimal place, obtained by normalization of from 0 to 1. In an actual table, however, all values are stored as integers.

Figure 1:
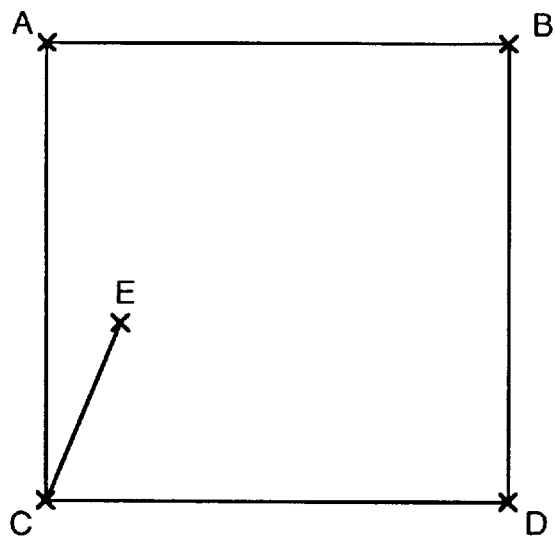
FIG. 1 is a diagram for describing nearest neighbor interpolation according to the prior art.
Figure 2:
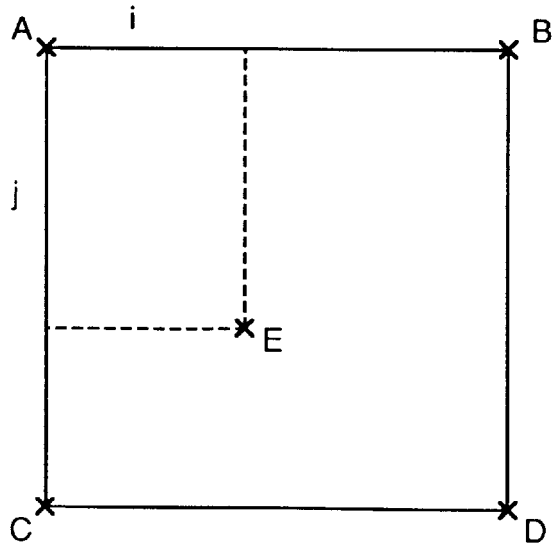
FIG. 2 is a diagram for describing bi-linear interpolation according to the prior art.
Figure 3:
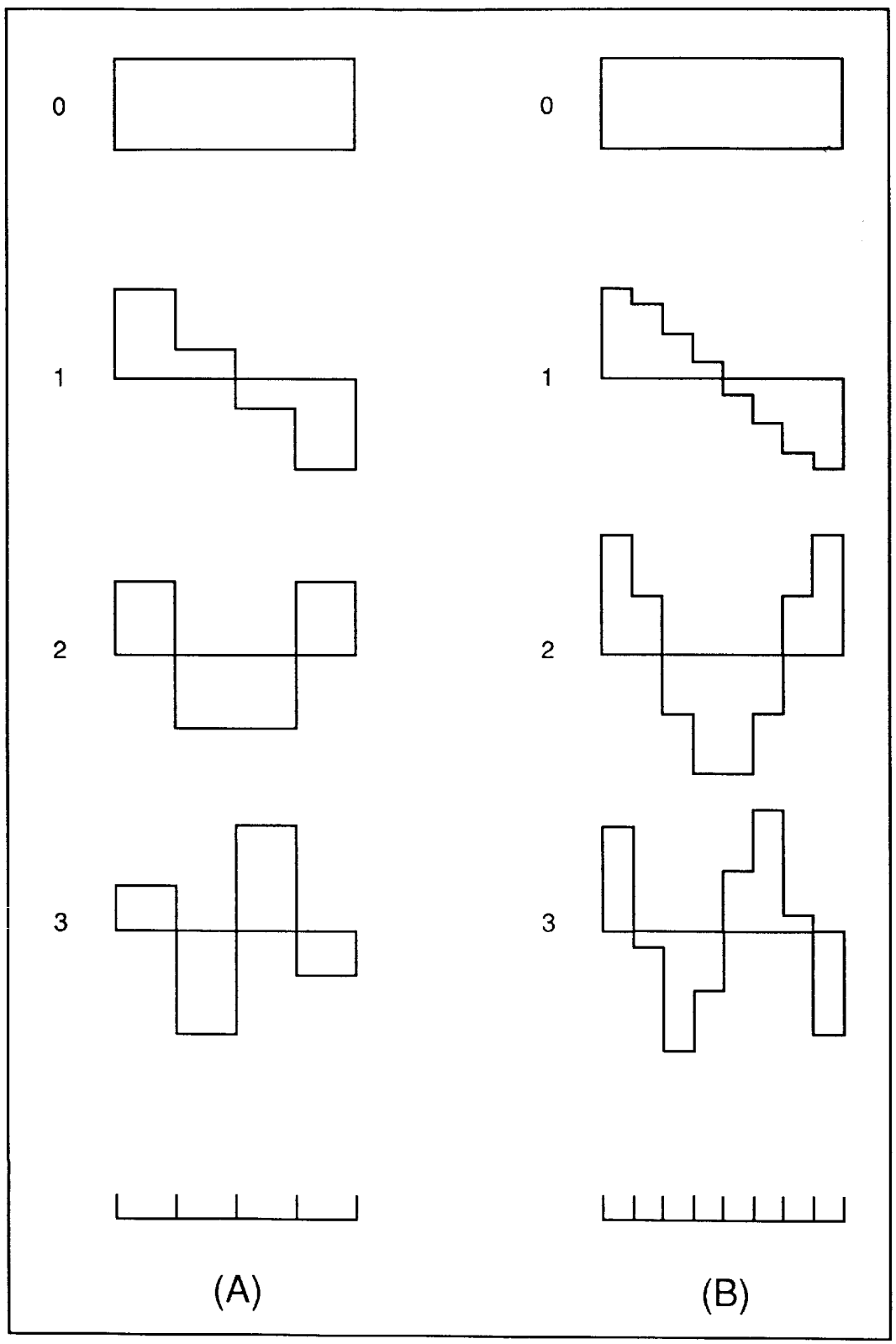
FIG. 3 is a diagram comparing bases of fourth-order DCT and eighth-order DCT at the same sequence numbers.
Figure 4:
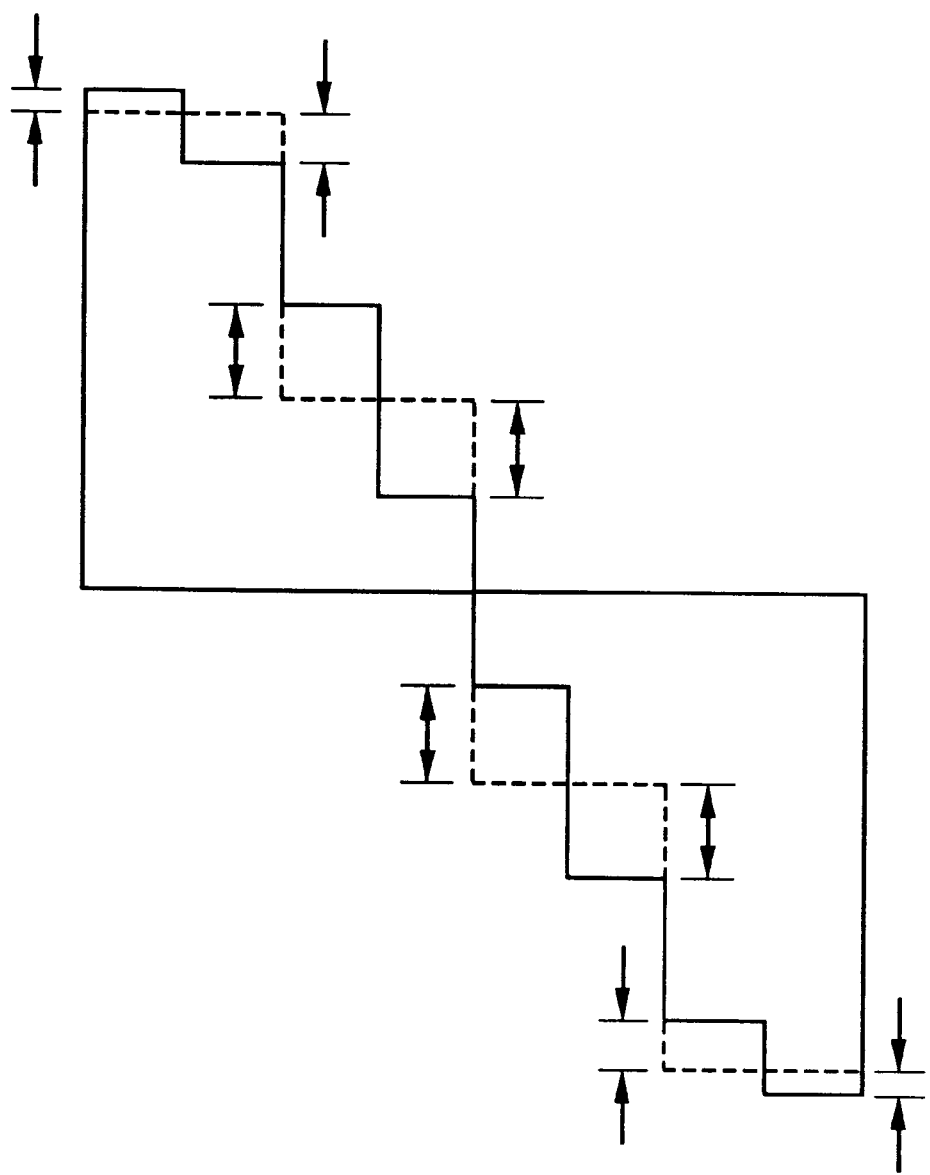
FIG. 4 is a diagram comparing bases of fourth-order DCT and eighth-order DCT at sequence number 1.
Figure 11:
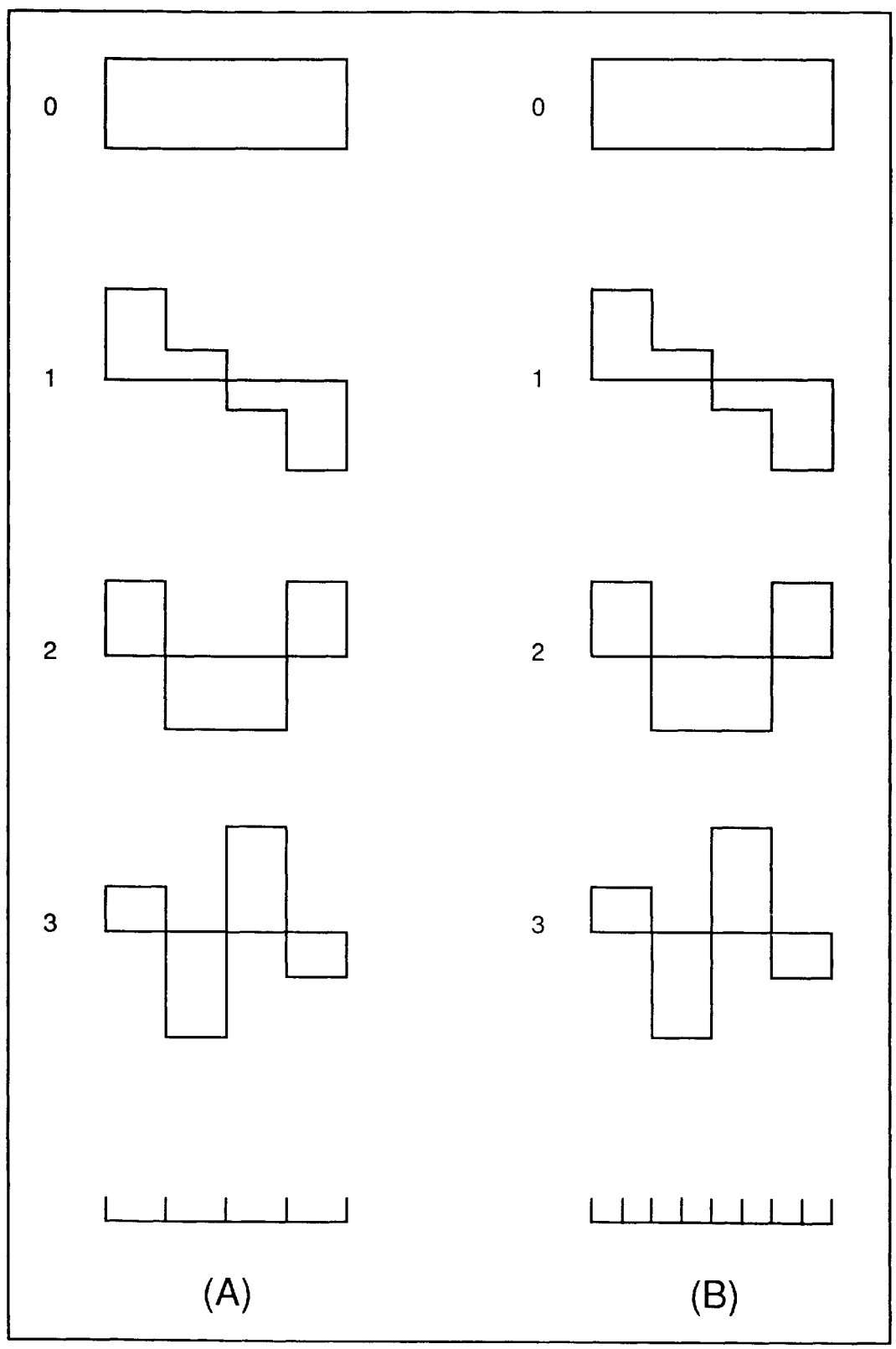
FIG. 11 is a diagram comparing basic vectors of DCT and basic vectors of reverse transformation.

FIG. 11 illustrates a comparison between basic vectors [(a) in FIG. 11] of a DCT and basic vectors [(b) in FIG. 11] obtained by transposing the reverse transformation matrix shown in FIG. 10. It will be appreciated from FIG. 11 that the bases of FIG. 10 have been created in such a manner that the bases having the same sequence number are identical even through the number of pixels changes. In other words, error components of the kind shown in FIGS. 4 and 5 do not occur.

FIGS. 12A to 12D illustrate examples in which a reverse transformation has been performed with respect to an edge portion in an image using the basic vectors of FIG. 10. In order to simplify the description, all decimal points have been computed and the effects of quantization are not taken into account. FIG. 12A illustrates one block of input image information in real space; FIG. 12B the results of subjecting the information of FIG. 12A to a DCT at a block size of 4×4; FIG. 12C the results of substituting "0" into high-frequency components on the basis of the transformation coefficients of FIG. 12B; and FIG. 12D the results of applying an 8×8 IDCT on the basis of the transformation coefficients of FIG. 12C using the basic vectors of FIG. 10.

It will be appreciated from this example also that the reverse transformation based upon the basic vectors of FIG. 10 is equivalent to a 0th-order interpolation. That is, it should be appreciated that a 0th-order interpolation is possible in simple fashion even in a method of implementing a resolution conversion directly from the compressed state. FIG. 13 illustrates basic vectors of an IDCT of an 8×8 block. As in FIG. 10, FIG. 13 illustrates values, to the fourth decimal place, of the results of computing cosine components. For example, if two types of basic vectors of FIGS. 10 and 13 are stored in the base LUT 103 of FIG. 7 beforehand, it becomes possible to select the most suitable basic vector dynamically block by block.

Figure 14:
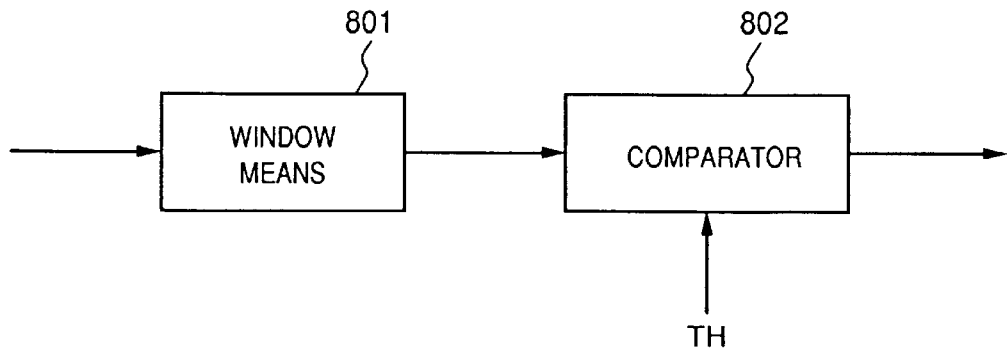
FIG. 14 is a diagram showing the construction of a characteristic-quantity discriminating unit in FIG. 7.
Figure 15:
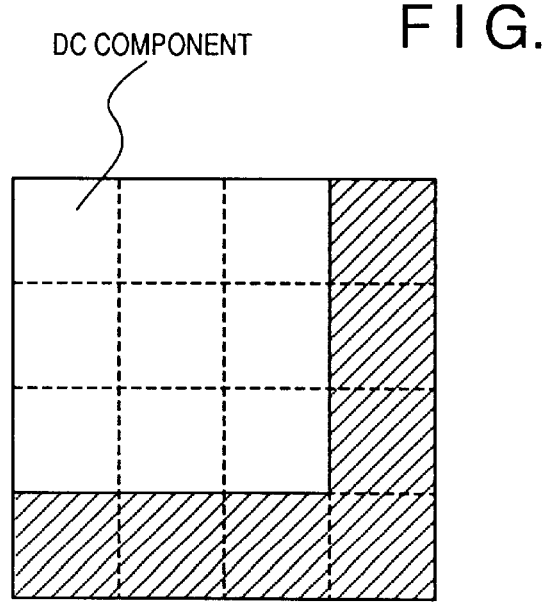
FIG. 15 is a diagram showing a window illustrated in FIG. 14.

FIG. 14 shows an example of the characterizing-quantity discriminator 101 of FIG. 7. Numeral 801 denotes window means which applies a window for detecting characterizing quantity to the high-frequency region of components of input block information after application of reverse quantization. Here it is assumed that the window has been applied to an F(i,3) component and an F(3,j) component of the kind shown in FIG. 15 (the shaded portions) (0≦i≦3, 0≦j≦3).

The output of the window means 801 is applied to an comparator 802. The latter performs a comparison to determine whether the components within the window have a power (absolute value is permissible) greater than a preset threshold value TH. The results of the comparison are sent to the base LUT 103 of FIG. 7. A block in which a large value of power is present in the high-frequency region is assumed to be an edge portion. Since a large error will be produced if the bases of an IDCT are used, the bases of FIG. 10 are employed. In blocks other than the above-mentioned block, the block is assumed to be a flat portion in which power is concentrated in the low-frequency region, and the bases of an IDCT are used.

By thus changing over bases dynamically, a resolution conversion providing excellent picture quality becomes possible. Though an example has been described in which two types of basic vectors are registered in the base LUT, a greater number of types of basic vectors may be registered.

The details of the decompression controller 208 are as described above. However, block information in which the number of pixels is increased by a factor of $(M/N)^2$ is rasterized in a rasterizing unit 209 shown in FIG. 8, and the output of the rasterizing unit 209 is sent to a printer engine 210.

It is of course necessary to correct the values of DC components based upon resolution conversion, as mentioned in the description of the prior art. However, this is not illustrated here.

<Second Embodiment>

Figure 16:
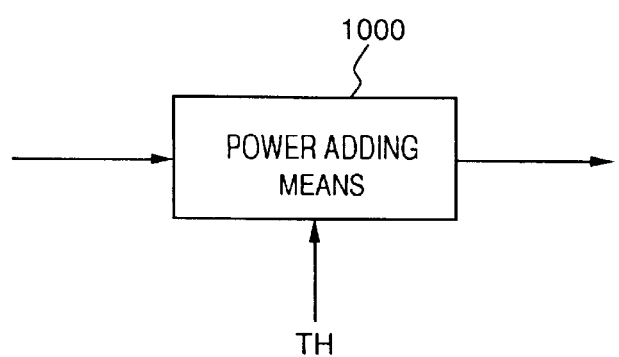
FIG. 16 is a diagram showing the construction of a characteristic-quantity discriminating unit according to a second embodiment.

FIG. 16 is a block diagram illustrating the principal portions of a second embodiment of the present invention. This is an example of the characterizing-feature discriminating unit 101 shown in FIG. 7. Two types of basic vectors (e.g., see the tables of FIGS. 10 and 13) are stored in this embodiment as well, and a changeover is performed in conformity with the characterizing quantity.

In FIG. 16, a case is assumed in which block information that has been subjected to reverse quantization enters and block size is 4×4. Numeral 1000 denotes AC-power adding means for adding the power values of 15 AC components in the entered block (addition of absolute values also is permissible). The total power of the 15 AC components and a preset threshold value TH are compared. If the total power is greater than TH, then it is judged that this corresponds to an edge portion because the power of the overall block is large. In this case the table of FIG. 10 is selected. If the total power is less than TH, it is judged that this corresponds to a flat portion and, hence, the table of FIG. 13 is selected.

By changing over bases dynamically in this fashion, an excellent image can be outputted.

<Third Embodiment>

Figure 17:
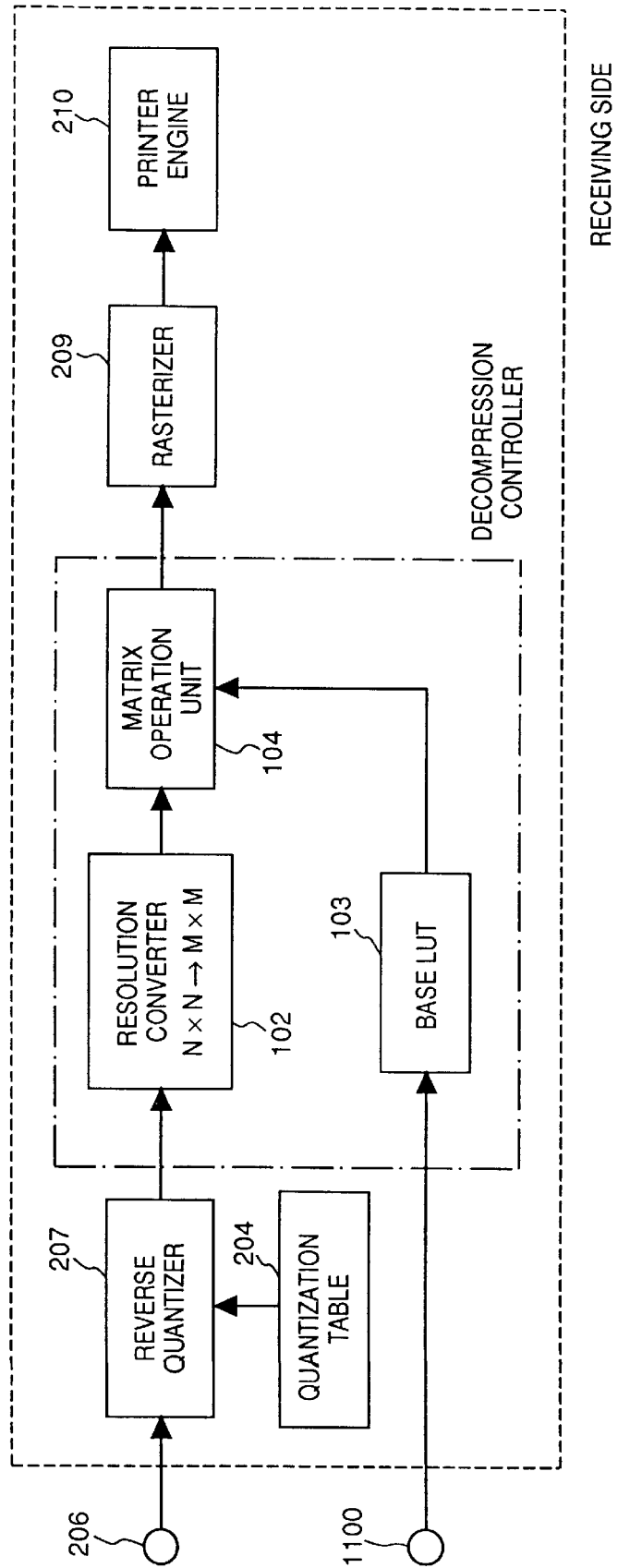
FIG. 17 is a block diagram illustrating the construction of a receiving side according to a third embodiment.

FIG. 17 is a block diagram showing the principal portions of a third embodiment. Components identical with those on the receiving side in FIG. 8 are designated by like reference numerals. The portion corresponding to the decompression controller (the portion enclosed by the broken line) in FIG. 17 also is illustrated in FIG. 17. The receiving side includes the input terminal 206. AS in the first embodiment, encoded block information enters from the terminal 206 and is subjected to reverse quantization by the reverse quantizer 207, and the resulting information is subjected to a resolution conversion by the resolution converter 102. The receiving side further has an input terminal 1100 for entry of information that designates which table among tables in the base LUT 103 is used. That is, the feature of the third embodiment is that table designation is performed rather than a dynamic changeover every block in conformity with the characterizing quantities.

As in the foregoing embodiments, a case will be considered in which the input and output block sizes are 4×4 and 8×8, respectively. Here it is assumed that the tables shown in FIGS. 13 and 18 have been stored in the base LUT 103. The table shown in FIG. 18 has been created on the basis of the table (the basic vectors of the IDCT of the 8×8 block) illustrated in FIG. 13. Here F(i,1) (0≦i≦7) in the table of FIG. 13 is varied. According to this embodiment, "0" is substituted into the transformation coefficients in the high-frequency region, and therefore portions corresponding to basic vectors do not exist.

FIG. 19 shows a comparison between the table of FIG. 18 and the table of FIG. 13. The solid line in FIG. 19 indicates sequence number 1 of the transposed matrix in the table of FIG. 13, and the dashed line indicates sequence number 1 of the transposed matrix in he table of FIG. 18. The portion shown by the dashed ine is broader vertically and has a steeper curve.

FIG. 20A to 20E are diagrams illustrating the results of applying a reverse transformation to the table of FIG. 18. FIG. 20A illustrates 4×4 block information in real space, FIG. 20B the results of subjecting the block in FIG. 20A to a DCT at 4×4, and FIG. 20C the results of appending "0" to the high-frequency components of the information in FIG. 20B. Further, FIGS. 20D and 20E illustrate the results of reverse transformation of an 8×8 block in FIG. 20C based upon the basic vectors shown in FIGS. 13 and 18, respectively.

A comparison of FIGS. 20D and 20E shows that an edge tends to be steeper in FIG. 20E even in information in real space. In other words, enlargement blurring that accompanies conversion of resolution is reduced so that it is possible to create a better edge.

Figure 21:
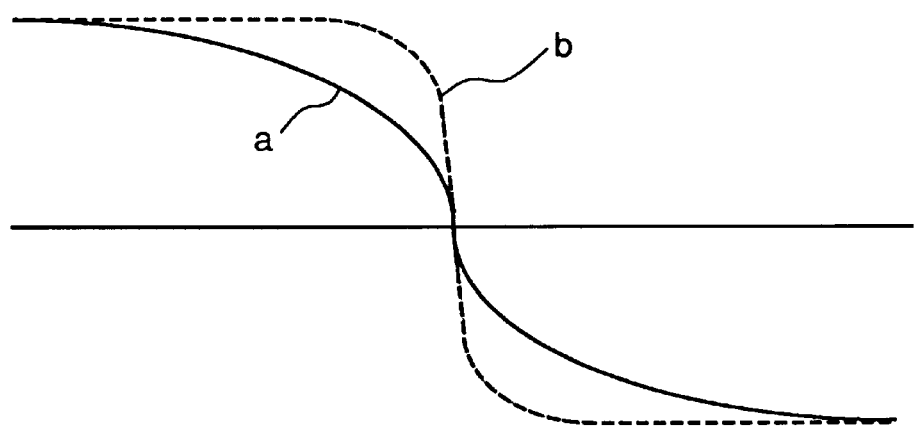
FIG. 21 is a diagram conceptually illustrating a disparity in bases.
Figure 22:
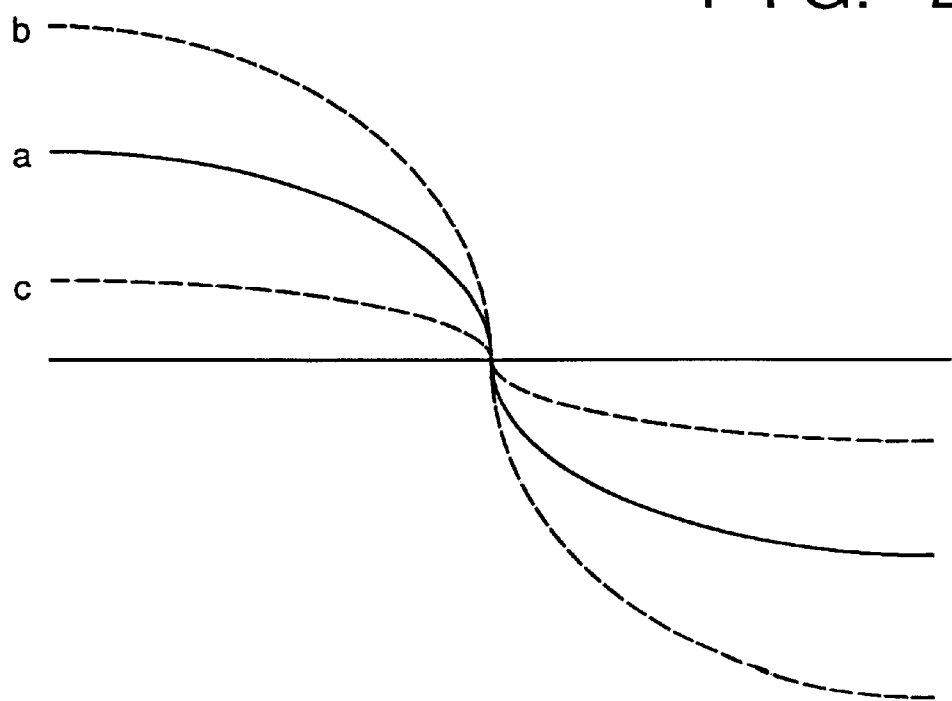
FIG. 22 is a diagram conceptually illustrating a disparity in quantization.

FIGS. 21 and 22 are diagrams illustrating a comparison between change of bases and quantization of bases. FIG. 21 is a diagram obtained by drawing FIG. 19 conceptually for ease of understanding. In FIG. 21, a indicates a transposed basic vector of an IDCT (a basic vector of a DCT), and b indicates a basic vector based upon transposition of the matrix shown in FIG. 18. Though the waveforms differ, the positions of the ends are the same.

FIG. 22 is a diagram conceptually illustrating a change in transformation coefficients by quantization. The change in transformation coefficients by quantization corresponds to a change in the power of the component, namely a change in the amplitude. In FIG. 22, amplitude of a increases (in the case of b) and decreases (in the case of c). Owing to the increase and decrease in amplitude, continuity between blocks is disturbed and is sensed as block distortion.

In a case where picture quality is varied in DCT space, the only expedient usually available is to change the transformation coefficients. However, changing the waveform of the base makes it possible to control picture quality without producing block distortion, as shown in FIG. 21.

As for the designation of the table of basic vectors, the basic vectors of FIG. 18 are designated in a case where it is desired to output an edge steeply because enlargement blurring due to conversion of resolution is not wanted on the receiving or transmitting side. In other cases the basic vectors of FIG. 13 are designated. Further, an arrangement is conceivable in which, say, the basic vectors of FIG. 10 are stored beforehand and selected depending upon the type of image. For example, the basic vectors of FIG. 10 are used in an output of computer graphics.

<Fourth Embodiment>

Figure 23:
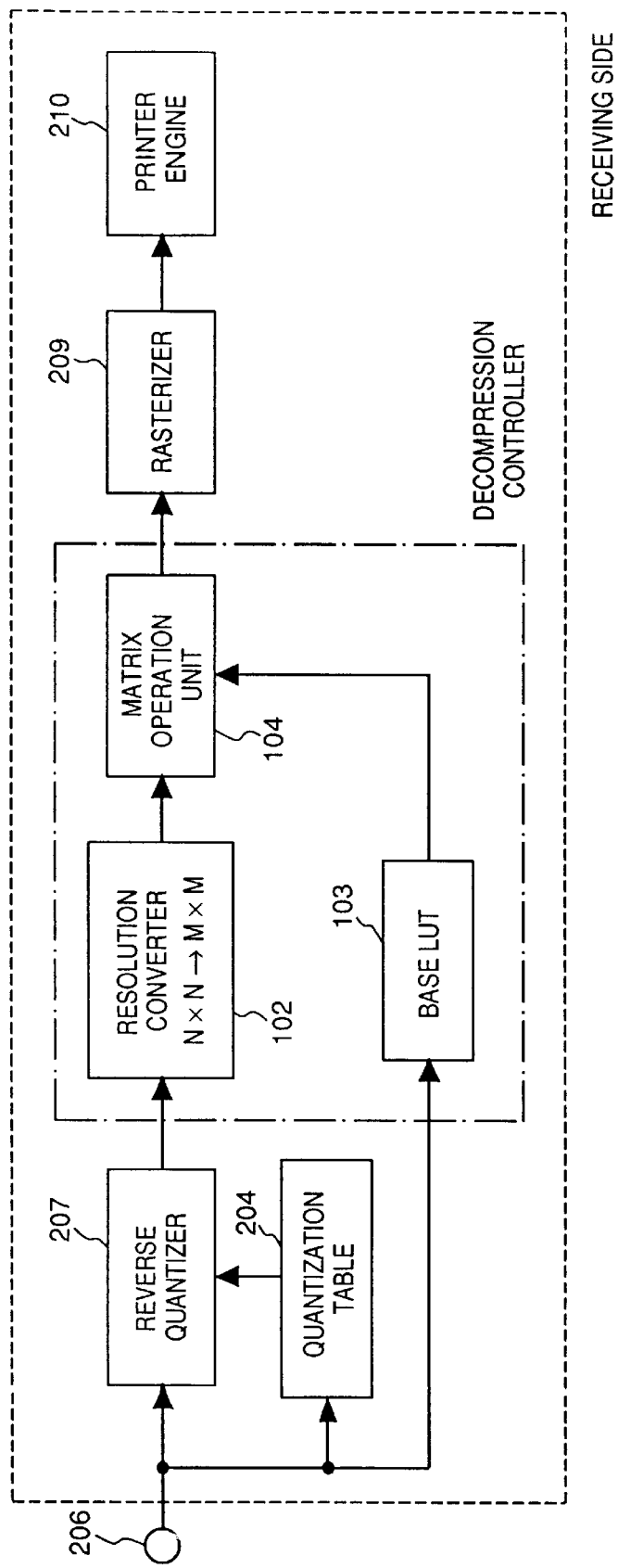
FIG. 23 is a block diagram illustrating the construction of a receiving side according to a fourth embodiment.

FIG. 23 is a block diagram showing the principal portions of a fourth embodiment. Components identical with those on the third embodiment shown in FIG. 17 are designated by like reference numerals. In the third embodiment, a case is described in which base changeover is selected by a designation made by the user. In the fourth embodiment, however, an example is described in which base vectors are changed in dependence upon the quantization table. Though an example of a quantization table is illustrated in FIG. 9, the quantizer has a direct influence upon the compression ratio. That is, there is a close correlation between the compression ratio and the coarseness of quantization and this forms a condition that runs counter to picture quality.

For example, consider a case in which quantization coefficients are subjected to entropic encoding according to the JPEG technique. In this case, in order to keep the compression ratio under a certain fixed value, control is required in which the quantization table is changed over dynamically or the coefficients (scaling factors) which multiply the quantization coefficients are changed over. A quantization table changed over is multiplexed with image information and downloaded from the transmitting side. If the type of table used has been decided in advance on the transmitting/receiving side, it is possible also to transmit the index (table number) of the table. In a case where scaling factors are used, an arrangement is permissible in which the multiplying coefficients send in succession.

In the arrangement of FIG. 23, information relating to the quantization table (the information may be quantization coefficients downloaded beforehand, as set forth above, or table index numbers) is transmitted from the input terminal 206 on the receiving side along with the encoded image information. By virtue of this information, reverse quantization is carried out by the quantization coefficients supplied from the quantization table 204 and conversion of resolution is executed just as in the foregoing embodiments.

In the fourth embodiment, a characterizing feature is that the changeover of basic vectors is executed in operative association with the changeover of the quantization table. It is very difficult to cancel a deterioration in image quality due to quantization by changing over the base. However, it is possible to experimentally create basic vectors which make this deterioration less visibly conspicuous in conformity with the quantization characteristics.

For example, the reverse transformation based upon the basic vectors shown in FIG. 10 is equivalent to a 0th-order interpolation. However, in case of a coarse quantization table which results in sudden deterioration in picture quality, the same pixel values are repeated to the point of deterioration by the 0th-order interpolation and the deterioration becomes conspicuous. In other words, linked operation is possible in which the quantization table of FIG. 10 is used in the case of a fine quantization table and different basic vectors, e.g., the quantization table of FIG. 13, is used in the case of a coarse quantization table. By virtue of this operative association, conversion of resolution providing excellent image quality can be performed.

In this embodiment, linear quantization is described. However, it is possible to execute a similar changeover even in the case of non-linear quantization.

Further, in the case of a color image, for example, encoding is performed upon separating the image signal into luminance and color-difference signals. However, a different quantization table often is used in quantization for this case. Even in case of output of such a color image, it is useful to adopt an arrangement in which basic vectors suited to specification of quantization of each color component are created color by color and quantization tables are changed over in operative association.

<Fifth Embodiment>

FIG. 24 is a block diagram showing the principal portions of a fifth embodiment. In this embodiment, a case is described in which a value other than "0" is substituted in the high-frequency region of increased block size at the time of conversion of resolution.

Components identical with those of the first embodiment shown in FIG. 7 are designated by like reference numerals. The dashed line in FIG. 24 indicates the decompression controller on the receiving side, as in the above-described embodiment. Block information obtained by reverse quantization of encoded image information from the transmitting side enters from the input terminal 100. Numeral 1800 denotes a high-frequency estimating unit for estimating, from block information of NXN pixels, information in a higher frequency region. There is no limitation upon the method of estimation. It is permissible to utilize an autoregression model of the kind described in the specification of Japanese Patent Publication No. 3-204268. A resolution converter 1801 increases the block size from NXN pixels to MXM pixels. Whereas "0" is substituted into the high-frequency region in the foregoing embodiments, information estimated by the high-frequency estimating unit 1800 is appended to the high-frequency region in this embodiment.

The high-frequency estimating unit 1800 judges the features of the image and adds information onto the high-frequency region. On the basis of which basic vectors reverse quantization is to be carried out is selected from the base LUT 103 accordingly.

For example, the value of F(i,j) ($0 \leq i \leq 7, 4 \leq j \leq 7$) is made "0" on the premise that "0" is substituted into the high-frequency region of a block after the conversion of resolution. However, if a value other than "0" is substituted into the high-frequency region, coefficients necessary for a matrix operation are created experimentally also for the value of the basic vector F(i,j) ($0 \leq i \leq 7, 4 \leq j \leq 7$).

In the prior art, the only method available is one in which the bases use the bases of an MXM-IDCT even though coefficients in the high-frequency region are estimated and substituted. In accordance with the fifth embodiment, however, the basic vectors are decided experimentally. Therefore, rather than taking an approach based upon a high-frequency region, a technique in which image quality is improved by excluding the highs and lows of frequency and utilizing the remaining components can be adopted with ease. In other words, the components to which "0" has been attached thus far are not considered to be high-frequency components in DCT space. If these are assumed to be arbitrary components, bases are decided and coefficients which improve picture quality are substituted, good results will be obtained and the degree of freedom in control of picture quality is increased.

The foregoing describes a method in which basic vectors are decided and registered and conversion of resolution is performed on the basis of these vectors. However, the basic vectors mentioned thus far are one example and the invention is not limited thereto. Further, though DCT and reverse transformation have been described with regard to block sizes of 4×4 and 8×8, respectively, this does not impose a limitation upon the invention.

Furthermore, an example of the judgment of characteristic quantities has been illustrated. However, the method of judgment is not limited to this. In addition, though DCT has been taken as an example in describing orthogonal transformation, other types of orthogonal transformation may be used as a matter of course.

Further, though enlargement has been taken as an example, the idea of the invention can be used in reduction as well.

Further, though a square matrix has been taken as an example, the invention is not limited to a square matrix.

The present invention can be applied to a system constituted by a plurality of devices or to an apparatus comprising a single device. Furthermore, it goes without saying that the invention is applicable also to a case where the object of the invention is attained by supplying a program to a system or apparatus.

Thus, in accordance with the embodiments as described above, bases which differ from basic vectors prevailing at the time of orthogonal transformation are used at the time of a reverse transformation in an arrangement in which compression by orthogonal transformation and conversion of resolution are combined. As a result, it is possible to prevent deterioration of picture quality which accompanies an increase in block size in the prior art.

Further, by using bases adapted to the quantization conditions, it is possible to a prevent deterioration in picture quality which occurs when quantization is carried out.

Further, since bases are stored in a ROM or the like and used as a LUT, the invention can be realized through a very simple arrangement.

Further, since bases are created experimentally, design of picture quality suited to the system can be performed with ease.

By virtue of the foregoing embodiments, low-resolution image information can readily be converted to high-resolution information. As a result, it is possible to provide communication between devices having different resolutions as well as a printer, copier or facsimile machine for outputting high-resolution images upon performing enlargement by zooming.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:
    transforming means for orthogonally transforming image information in a first pixel block of (NXN) pixels and for generating a first coefficient block of (NXN) orthogonal transformed coefficients, N being an integer which is 2 or more;
    creating means for creating a second coefficient block of (MXM) coefficients by using the first coefficient block, M being an integer which is different from N; and
    transforming means for transforming the second coefficient block and for generating a second pixel block of (MXM) pixels, using a created matrix other than any of transposed orthogonal transformation matrices, the created matrix operating on the second coefficient block to suppress a distortion of the image information caused by a difference of transforming dimensions and to transform coefficient data into pixel data.

2. The apparatus according to claim 1, further comprising:
    storage means for storing at least two types of basic vectors respectively including the created matrix and the transposed orthogonal transformation matrix; and
    judging means for judging characteristics of the orthogonally transformed information within the block;
    wherein said means for transforming the second coefficient block performs that transformation using a desired basic vector, which has been stored in said storage means, in accordance with results of a judgment performed by said judging means.

3. The apparatus according to claim 2, wherein said characteristics include a value of an orthogonal transformed coefficient representing a power of a high frequency component.

4. The apparatus according to claim 2, wherein said characteristics include a total of values of orthogonal transformed coefficients each representing a power of high frequency components.

5. The apparatus according to claim 2, wherein said storage means stores said transposed matrix $[G_M]^t$ as basic vectors.

6. The apparatus according to claim 1, further comprising storage means for storing at least two types of basic vectors respectively including the created matrix and the transposed orthogonal transformation matrix,
    wherein said means for transforming the second coefficient block performs that transformation using a basic vector, which has been stored in said storage means, designated by a user.

7. The apparatus according to claim 1, further comprising storage means for storing at least two types of basic vectors including the created matrix and the transposed orthogonal transformation matrix;
    wherein said means for transforming the second coefficient block performs that transformation using a basic vector, which has been stored in said storage means, in accordance with quantization conditions.

8. The apparatus according to claim 1, wherein said creating means places the (NXN) orthogonally transformed coefficients of the first coefficient block in a low-frequency region of the second coefficient block and substitutes "0" into a high-frequency region of the second coefficient block.

9. The apparatus according to claim 1, wherein the orthogonal transformation is a discrete cosine transformation.

10. An image processing method, comprising the steps of:
    orthogonally transforming image information in a first pixel block of (NXN) pixels and generating a first coefficient block of (NXN) orthogonal transformed coefficient, N being an integer which is 2 or more;
    creating a second coefficient block of (MXM) coefficients by using the first coefficient block, M being an integer which is different from N; and transforming the second coefficient block to generate a second pixel block of (MXM) pixels by using a created matrix other than any of transposed orthogonal transformation matrices, the created matrix operating on the second coefficient block to suppress a distortion of the image information caused by a difference of transforming dimensions and to transform coefficient data into pixel data.

* * * * *

UNITED STATES PATENT AND TRADEMARK OFFICE
CERTIFICATE OF CORRECTION

PATENT NO. : 5,911,007

DATED : June 8, 1999

INVENTOR(S) : NOBUTAKA MIYAKE

Page 1 of 2

It is certified that error appears in the above-identified patent and that said Letters Patent is hereby corrected as shown below:

ON COVER PAGE AT [56], OTHER PUBLICATIONS

"Chang et al., "Transform Coding of Arbitrarily-Shaped Image Segments", Aug. 1, 1993. pp. 83-90." should read --Chang et al., "Transform Coding of Arbitrarily-Shaped Image Segments", Proc. ACM Multimedia 93, Aug. 1, 1993, pp. 83-90.--

ON COVER PAGE AT [56], FOREIGN PATENT DOCUMENTS

"4185171" should read --4-185171--.

COLUMN 3

Line 17, "direction." should read --directions.--;
Line 19, "(a)" should read --(A)--;
Line 20, "(b)" should read --(B)--;
Line 27, "(a)" should read --(A)--;
Line 64, "graphics CG)." should read --graphics (CG).--.

COLUMN 5

Line 43, "window" should read --window applied by the window means--.

COLUMN 9

Line 22, "an" should read --a--.

COLUMN 10

Line 12, "AS" should read --As--;
Line 41, "FIG. 20A" should read --FIGS. 20A--.

COLUMN 11

Line 22, "on" should read --of--.

UNITED STATES PATENT AND TRADEMARK OFFICE
CERTIFICATE OF CORRECTION

PATENT NO.   :  5,911,007

DATED        :  June 8, 1999

INVENTOR(S)  :  NOBUTAKA MIYAKE

It is certified that error appears in the above-identified patent and that said Letters Patent is hereby corrected as shown below:

COLUMN 13

Line 42, "a prevent" should read --prevent a--.

NY_MAIN 26035 v 1

Signed and Sealed this

Twenty-fifth Day of January, 2000

Attest:

Attesting Officer

*Acting Commissioner of Patents and Trademarks*